(12) United States Patent
Goetzinger et al.

(10) Patent No.: US 7,187,684 B2
(45) Date of Patent: Mar. 6, 2007

(54) WEIGHTED FAIR QUEUE HAVING EXTENDED EFFECTIVE RANGE

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 10/016,518

(22) Filed: Nov. 1, 2001

(65) Prior Publication Data

US 2003/0081545 A1     May 1, 2003

(51) Int. Cl.
*H04L 12/56* (2006.01)
(52) U.S. Cl. .................. 370/412; 370/468; 370/395.4
(58) Field of Classification Search ............. 370/412, 370/468, 395.4, 395.41, 395.42, 395.43
See application file for complete search history.

(56) References Cited

U.S. PATENT DOCUMENTS

| | | | |
|---|---|---|---|
| 4,621,359 A | 11/1986 | McMillen | |
| 5,249,184 A | 9/1993 | Woest et al. | |
| 5,490,141 A | 2/1996 | Lai et al. | |
| 5,548,590 A | 8/1996 | Grant et al. | |
| 5,629,928 A | 5/1997 | Calvignac et al. | |
| 5,650,993 A | 7/1997 | Lakshman et al. | |
| 5,742,772 A | 4/1998 | Sreenan | |
| 5,831,971 A | 11/1998 | Bonomi et al. | |
| 5,835,494 A * | 11/1998 | Hughes et al. ............. | 370/397 |
| 5,844,890 A | 12/1998 | Delp et al. | |
| 5,850,399 A | 12/1998 | Ganmukhi et al. | |
| 5,905,730 A * | 5/1999 | Yang et al. ................ | 370/429 |
| 5,926,459 A | 7/1999 | Lyles et al. | |
| 5,926,481 A | 7/1999 | Wang et al. | |
| 5,946,297 A | 8/1999 | Calvignac et al. | |

(Continued)

FOREIGN PATENT DOCUMENTS

EP          0859492 A2     8/1998

(Continued)

OTHER PUBLICATIONS

U.S. Appl. No. 10/102,343, filed Mar. 20, 2002, "Network Processor Having Fast Flow Queue Disable Process".

(Continued)

*Primary Examiner*—Ricky Q. Ngo
*Assistant Examiner*—Nguyen H. Ngo
(74) *Attorney, Agent, or Firm*—Dugan & Dugan

(57) ABSTRACT

A scheduler for a network processor includes a scheduling queue in which weighted fair queuing is applied to define a sequence in which flows are to be serviced. The scheduling queue includes at least a first subqueue and a second subqueue. The first subqueue has a first range and a first resolution, and the second subqueue has an extended range that is greater than the first range and a lower resolution that is less than the first resolution. Flows that are to be enqueued within the range of highest precision to the current pointer of the scheduling queue are attached to the first subqueue. Flows that are to be enqueued outside the range of highest precision from the current pointer of the scheduling queue are attached to the second subqueue. Numerous other aspects are provided.

12 Claims, 8 Drawing Sheets

U.S. PATENT DOCUMENTS

| | | | |
|---|---|---|---|
| 5,999,963 | A | 12/1999 | Bruno et al. |
| 6,014,367 | A | 1/2000 | Joffe |
| 6,018,527 | A | 1/2000 | Yin et al. |
| 6,028,842 | A | 2/2000 | Chapman et al. |
| 6,028,843 | A | 2/2000 | Delp et al. |
| 6,031,822 | A | 2/2000 | Wallmeier |
| 6,038,217 | A | 3/2000 | Lyles |
| 6,041,059 | A | 3/2000 | Joffe et al. |
| 6,052,751 | A | 4/2000 | Runaldue et al. |
| 6,064,650 | A | 5/2000 | Kappler et al. |
| 6,064,677 | A | 5/2000 | Kappler et al. |
| 6,067,301 | A | 5/2000 | Aatresh |
| 6,072,772 | A | 6/2000 | Charny et al. |
| 6,072,800 | A | 6/2000 | Lee |
| 6,078,953 | A | 6/2000 | Vaid et al. |
| 6,081,507 | A | 6/2000 | Chao et al. |
| 6,092,115 | A | 7/2000 | Choudhury et al. |
| 6,094,435 | A | 7/2000 | Hoffman et al. |
| 6,101,193 | A * | 8/2000 | Ohba ........................ 370/429 |
| 6,104,700 | A | 8/2000 | Haddock et al. |
| 6,108,307 | A | 8/2000 | McConnell et al. |
| 6,122,673 | A | 9/2000 | Basak et al. |
| 6,144,669 | A | 11/2000 | Williams et al. |
| 6,157,614 | A | 12/2000 | Pasternak et al. |
| 6,157,649 | A | 12/2000 | Peirce et al. |
| 6,157,654 | A | 12/2000 | Davis |
| 6,160,812 | A * | 12/2000 | Bauman et al. ............. 370/416 |
| 6,169,740 | B1 | 1/2001 | Morris et al. |
| 6,188,698 | B1 | 2/2001 | Galand et al. |
| 6,226,267 | B1 | 5/2001 | Spinney et al. |
| 6,229,812 | B1 | 5/2001 | Parruck et al. |
| 6,229,813 | B1 | 5/2001 | Buchko et al. |
| 6,236,647 | B1 | 5/2001 | Amalfitano |
| 6,246,692 | B1 | 6/2001 | Dai et al. |
| 6,259,699 | B1 | 7/2001 | Opalka et al. |
| 6,266,702 | B1 | 7/2001 | Darnell et al. |
| 6,356,546 | B1 | 3/2002 | Beshai |
| 6,389,019 | B1 * | 5/2002 | Fan et al. ............. 370/395.42 |
| 6,389,031 | B1 | 5/2002 | Chao et al. |
| 6,404,768 | B1 | 6/2002 | Basak et al. |
| 6,481,251 | B1 | 11/2002 | Meier et al. |
| 6,563,829 | B1 | 5/2003 | Lyles et al. |
| 6,608,625 | B1 | 8/2003 | Chin et al. |
| 6,611,522 | B1 | 8/2003 | Zheng et al. |
| 6,721,325 | B1 | 4/2004 | Duckering et al. |
| 6,775,287 | B1 | 8/2004 | Fukano et al. |
| 6,810,012 | B1 | 10/2004 | Yin et al. |
| 6,810,043 | B1 * | 10/2004 | Naven et al. ............... 370/412 |
| 6,810,426 | B2 * | 10/2004 | Mysore et al. ............. 709/234 |
| 6,813,274 | B1 | 11/2004 | Suzuki et al. |
| 6,832,261 | B1 | 12/2004 | Westbrook et al. |
| 6,850,490 | B1 | 2/2005 | Woo et al. |
| 6,885,664 | B2 | 4/2005 | Ofek et al. |
| 6,891,835 | B2 | 5/2005 | Kalkunte et al. |
| 7,020,137 | B2 | 3/2006 | Kadambi et al. |
| 2001/0004363 | A1 | 6/2001 | Usukura, Takashi |
| 2001/0012294 | A1 | 8/2001 | Kadambi et al. |
| 2002/0003795 | A1 | 1/2002 | Oskouy et al. |
| 2002/0023168 | A1 | 2/2002 | Bass et al. |
| 2002/0136230 | A1 | 9/2002 | Dell et al. |
| 2002/0163922 | A1 | 11/2002 | Dooley et al. |
| 2002/0181455 | A1 | 12/2002 | Norman et al. |
| 2003/0050954 | A1 | 3/2003 | Tayyar et al. |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 04-094240 | 3/1992 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

Lyons, P.J. et al., "Estimating clock speeds for the ATMSWITCH architecture", 1999, Institute of Information Sciences and Technology—Massey University, pp. 1-14.

U.S. Appl. No. 10/015,994, filed Nov. 1, 2001, titled "Weighted Fair Queue Serving Plural Output Ports".

U.S. Appl. No. 10/015,760, filed Nov. 1, 2001, titled "Weighted Fair Queue Having Adjustable Scaling Factor".

U.S. Appl. No. 10/002,085, filed Nov. 1, 2001, titled "Empty Indicators for Weighted Fair Queues".

U.S. Appl. No. 10/004,373, filed Nov. 1, 2001, titled "QoS Scheduler and Method for Implementing Peak Service Distance Using Next Peak Service Time Violated Indication".

U.S. Appl. No. 10/002,416, filed Nov. 1, 2001, titled "QoS Scheduler and Method for Implementing Quality of Service with Aging Time Stamps".

U.S. Appl. No. 10/004,440, filed Nov. 1, 2001, titled "QoS Scheduler and Method for Implementing Quality of Service with Cached Status Array".

U.S. Appl. No. 10/004,217, filed Nov. 1, 2001, titled "QoS Scheduler and Method for Implementing Quality of Service Anticipating the End of a Chain of Flows".

* cited by examiner

WEIGHTED FAIR QUEUE HAVING EXTENDED EFFECTIVE RANGE

CROSS REFERENCE TO RELATED PATENT APPLICATIONS

The present application is related to the following U.S. patent applications, each of which is hereby incorporated by reference herein in its entirety:

U.S. patent application Ser. No. 10/015,994, filed Nov. 1, 2001, titled "WEIGHTED FAIR QUEUE SERVING PLURAL OUTPUT PORTS";

U.S. patent application Ser. No. 10/015,760, filed Nov. 1, 2001, titled "WEIGHTED FAIR QUEUE HAVING ADJUSTABLE SCALING FACTOR";

U.S. patent application Ser. No. 10/002,085, filed Nov. 1, 2001, titled "EMPTY INDICATORS FOR WEIGHTED FAIR QUEUES";

U.S. patent application Ser. No. 10/004,373, filed Nov. 1, 2001, titled "QoS SCHEDULER AND METHOD FOR IMPLEMENTING PEAK SERVICE DISTANCE USING NEXT PEAK SERVICE TIME VIOLATED INDICATION";

U.S. patent application Ser. No. 10/002,416, filed Nov. 1, 2001, titled "Qos SCHEDULER AND METHOD FOR IMPLEMENTING QUALITY OF SERVICE WITH AGING STAMPS";

U.S. patent application Ser. No. 10/004,440, filed Nov. 1, 2001, titled "QoS SCHEDULER AND METHOD FOR IMPLEMENTING QUALITY OF SERVICE WITH CACHED STATUS ARRAY"; and U.S. patent application Ser. No. 10/004,217, filed Nov. 1, 2001, titled "QoS SCHEDULER AND METHOD FOR IMPLEMENTING QUALITY OF SERVICE ANTICIPATING THE END OF A CHAIN OF FLOWS".

FIELD OF THE INVENTION

The present invention is concerned with storage and data communication systems and is more particularly concerned with a scheduler component of a network processor.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 (e.g., for storing data frame pointers and flow control information as described further below). The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers and flow control information. The memories 40 may, like the first memory 36, be QDRs. The additional memory 40 on the egress side of the network processor 10 may be needed because of a larger number of flows output through the second network ports 22 than through the first switch ports 16.

FIG. 2 schematically illustrates conventional queuing arrangements that may be provided for a data flow chip/scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

Flows with which the incoming data frames are associated are enqueued in a scheduling queue 42 maintained in the first scheduler chip 34. The scheduling queue 42 defines a sequence in which the flows enqueued therein are to be serviced. The particular scheduling queue 42 of interest in connection with the present invention is a weighted fair queue which arbitrates among flows entitled to a "best effort" or "available bandwidth" Quality of Service (QoS).

As shown in FIG. 2, the scheduling queue 42 is associated with a respective output port 44 of the first data flow chip 12. It is to be understood that the output port 44 is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one scheduling queue 42 and one corresponding output port 44 are shown, it should be understood that in fact there may be plural output ports and corresponding scheduling queues each assigned to a respective port. (However, according to an alternative embodiment, disclosed in co-pending patent application Ser. No. 10/015,994, filed Nov. 1, 2001, a group of output ports may be associated with each scheduling queue 42. This co-pending patent application is incorporated herein by reference.)

Although not indicated in FIG. 2, the first scheduler chip 34 also includes flow scheduling calendars which define output schedules for flows which are entitled to a scheduled QoS with guaranteed bandwidth, thus enjoying higher priority than the flows governed by the scheduling queue 42.

The memory 36 associated with the first scheduler chip 34 holds pointers ("frame pointers") to locations in the first data buffer 24 corresponding to data frames associated with the flows enqueued in the scheduling queue 42. The memory 36 also stores flow control information, such as information indicative of the QoS to which flows are entitled.

When the scheduling queue 42 indicates that a particular flow enqueued therein is the next to be serviced, reference is made to the frame pointer in the memory 36 corresponding to the first pending data frame for the flow in question and the corresponding frame data is transferred from the first data buffer 24 to an output queue 46 associated with the output port 44.

A more detailed representation of the scheduling queue 42 is shown in FIG. 3. As noted above, the scheduling queue 42 is used for weighted fair queuing of flows serviced on a "best effort" basis. In a particular example of a scheduling queue as illustrated in FIG. 3, the scheduling queue 42 has 512 slots (each slot represented by reference numeral 48). Other numbers of slots may be employed. In accordance with conventional practice, flows are enqueued or attached to the scheduling queue 42 based on a formula that takes into account both a length of a data frame associated with a flow to be enqueued and a weight which corresponds to a QoS to which the flow is entitled.

More specifically, the queue slot in which a flow is placed upon enqueuing is calculated according to the formula CP+((WF×FS)/SF), where CP is a pointer ("current pointer") that indicates a current position (the slot currently being serviced) in the scheduling queue 42; WF is a weighting factor associated with the flow to be enqueued, the weighting factor having been determined on the basis of the QoS to which the flow is entitled; FS is the size of the current frame associated with the flow to be enqueued; and SF is a scaling factor chosen to scale the product (WF×FS) so that the resulting quotient falls within the range defined by the scheduling queue 42. (In accordance with conventional practice, the scaling factor SF is conveniently defined as a integral power of 2—i.e., SF=$2^n$, with n being a positive integer—so that scaling the product (WF×FS) is performed by right shifting.) With this known weighted fair queuing technique, the weighting factors assigned to the various flows in accordance with the QoS assigned to each flow govern how close to the current pointer of the queue each flow is enqueued. In addition, flows which exhibit larger frame sizes are enqueued farther from the current pointer of the queue, to prevent such flows from appropriating an undue proportion of the available bandwidth of the queue. Upon enqueuement, data that identifies a flow (the "Flow ID") is stored in the appropriate queue slot 48.

In some applications, there may be a wide range of data frame sizes associated with the flows, perhaps on the order of about 64 bytes to 64 KB, or three orders of magnitude. It may also be desirable to assign a large range of weighting factors to the flows so that bandwidth can be sold with a great deal of flexibility and precision. In such instances, it is desirable that the scheduling queue in which weighted fair queuing is applied have a large range, where the range of the scheduling queue is defined to be the maximum distance that flow may be placed from the current pointer. As is understood by those who are skilled in the art, the scheduling queue 42 functions as a ring, with the last queue slot (number 511 in the present example) wrapping around to be adjacent to the first queue slot (number 0).

It could be contemplated to increase the range of the scheduling queue 42 by increasing the number of slots. However, this has disadvantages in terms of increased chip area, greater manufacturing cost and power consumption, and increased queue searching time. Alternatively, the resolution of the scheduling queue 42 could be decreased to increase the range, where "resolution" is understood to mean the inverse of the distance increment that corresponds to each slot in the queue. However, if resolution is decreased, flows that should be assigned different priorities according to their respective QoS may appear to "tie" by being assigned to the same slot, thereby improperly being assigned essentially equal service priority. Thus conventional practice in operating a weighted fair queue of the type described herein requires a tradeoff between resolution and range. In the particular example of a weighted fair queue as shown herein, having 512 slots, a distance increment of one distance unit may be assigned to each slot, in which case the queue has a range of 512. It would be desirable to increase the effective range of such a scheduling queue, without increasing the number of slots or decreasing the effective resolution.

SUMMARY OF THE INVENTION

According to a first aspect of the invention, a scheduler for a network processor is provided. The scheduler includes one or more scheduling queues each for defining a sequence in which flows are to be serviced. At least one scheduling queue includes at least a first subqueue and a second subqueue. The first subqueue has a first range and a first resolution, and the second subqueue has a second range that is greater than the first range and a second resolution that is less than the first resolution.

The first and second subqueues may, but need not, have equal numbers of slots. In one embodiment, the range of the second subqueue may be sixteen times the range of the first subqueue, and the resolution of the second subqueue may be one-sixteenth of the resolution of the first subqueue. Other relationships between range and/or resolution may be employed. For example, the range of the second subqueue may be larger than the range of the first subqueue by any amount, and the resolution of the second subqueue may be less than the resolution of the first subqueue by any amount (e.g., regardless of the amount by which the range of the second subqueue exceeds the range of the first subqueue). However, in embodiments of the invention wherein the first and the second subqueues have the same number of slots, maintaining a direct inverse relationship between the resolution and the range of the second subqueue allows for an "effective" increase in scheduling queue range without an accompanying increase in consumed chip area.

According to another aspect of the invention, a scheduler for a network processor is provided. The scheduler includes a scheduling queue in which flows are enqueued according to the formula CP+((WF×FS)/SF). In this formula CP is a pointer for indicating a current position in the scheduling queue, WF is a weighting factor associated with a flow appointed for enqueuing, FS is a frame size associated with the flow appointed for enqueuing, and SF is a scaling factor. The scheduling queue includes at least a first subqueue and a second subqueue. The flow appointed for enqueuing is enqueued to the first subqueue if the value of the expression ((WF×FS)/SF) is less than a range of the first subqueue. The flow appointed for enqueuing is enqueued to the second subqueue if the value of the expression ((WF×FS)/SF) is greater than a range of the first subqueue.

Still another aspect of the invention provides for a method of dequeuing a flow from a scheduling queue in a scheduler for a network processor. The method includes searching a first subqueue of the scheduling queue to find a first winning flow in the first subqueue, and determining a first queue distance corresponding to a distance between a current pointer and a slot in which the first winning flow is enqueued. The method further includes searching a second subqueue of the scheduling queue to find a second winning flow in the second subqueue, and determining a second queue distance corresponding to a distance between the current pointer and a slot in which the second winning flow is enqueued. The method further includes comparing the first and second queue distances, and selecting for dequeuing one of the first and second winning flows based on a result of the comparing step.

By configuring a scheduling queue as two or more subqueues having different ranges and resolutions, the present invention allows the scheduling queue to offer an enhanced range, without adding to the total number of queue slots, while providing much of the benefit of high resolution.

Other objects, features and advantages of the present invention will become more fully apparent from the following detailed description of exemplary embodiments, the appended claims and the accompanying drawings.

DETAILED DESCRIPTION

Exemplary embodiments of the invention will now be described with reference to FIGS. 4–8C.

Figure 1:
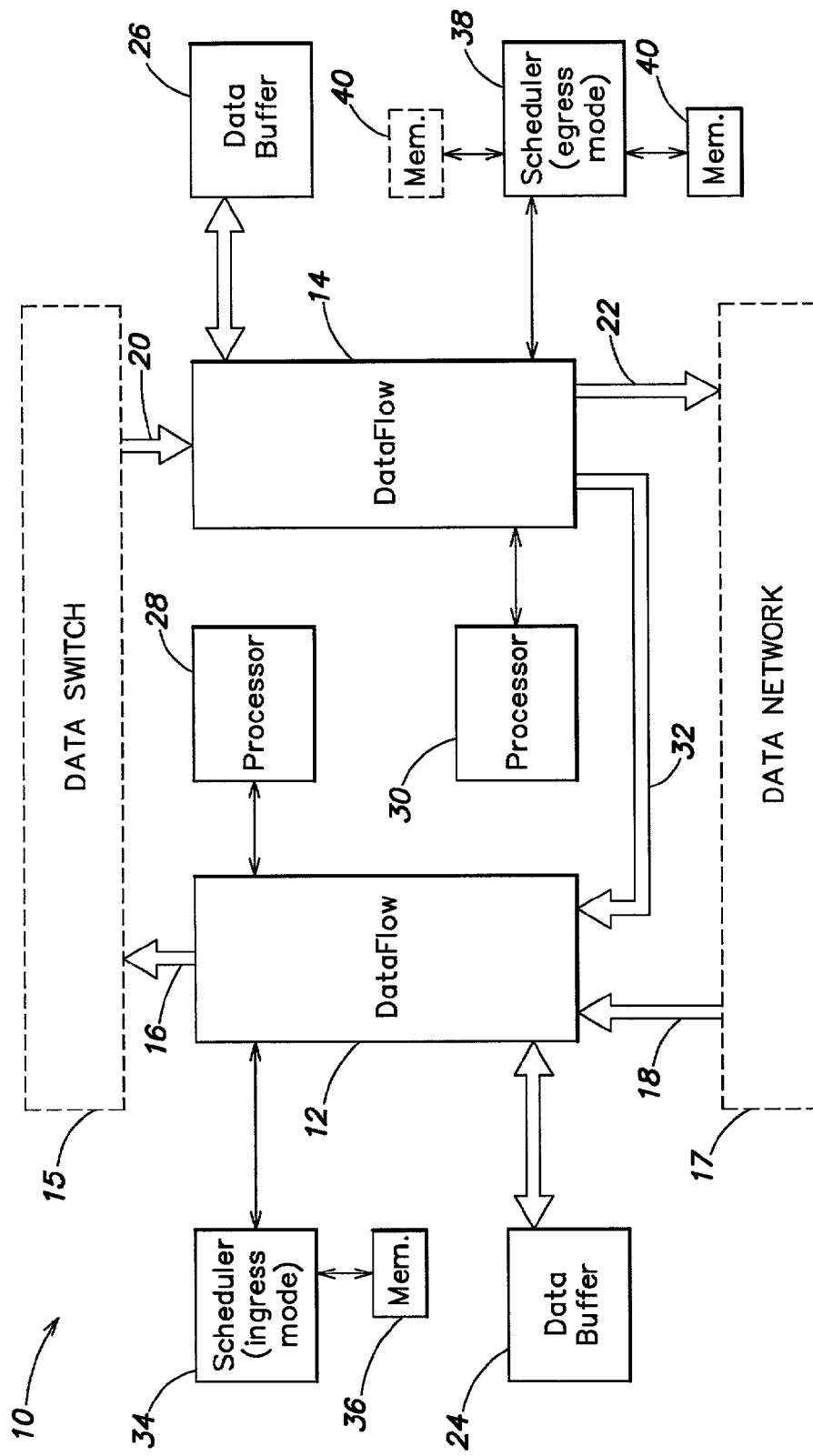
FIG. 1 is a block diagram of a conventional network processor in which the present invention may be applied.
Figure 4:
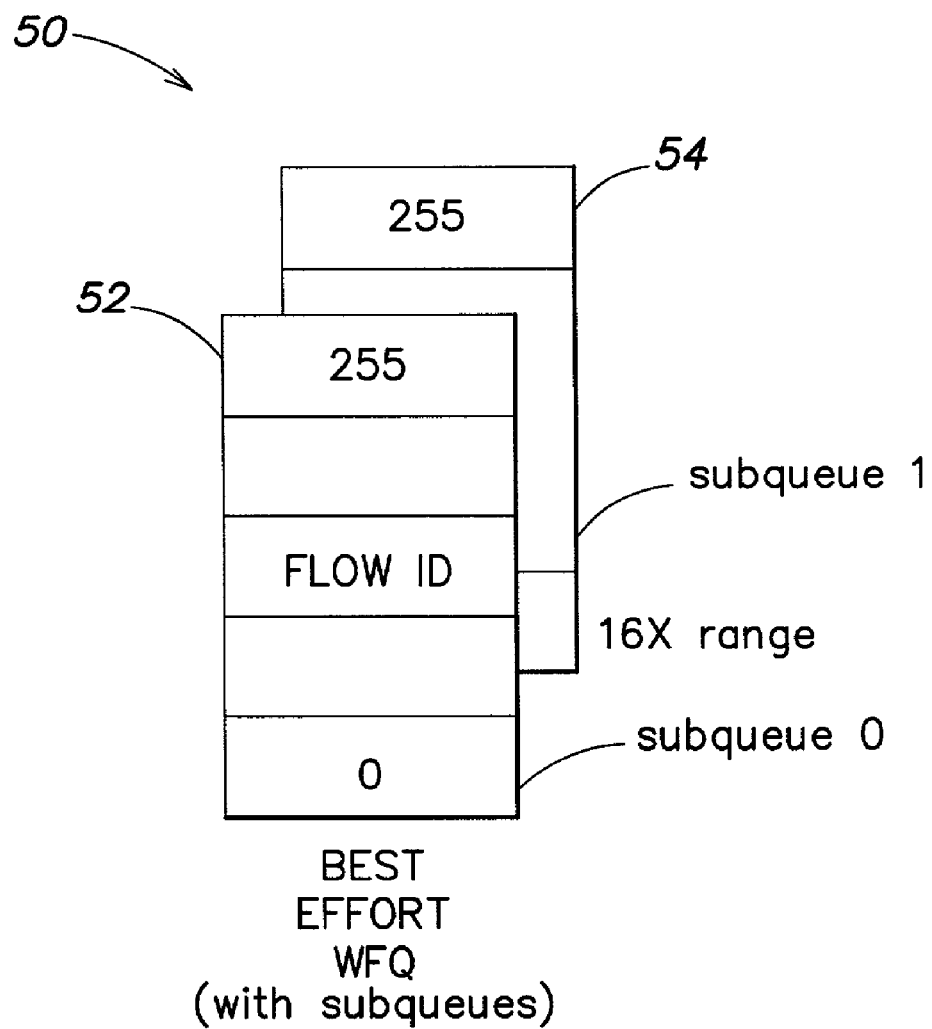
FIG. 4 is a pictorial representation of a scheduling queue including subqueues provided in accordance with the invention.

FIG. 4 pictorially illustrates a scheduling queue 50 that may be implemented in accordance with the invention in the first scheduler 34 and/or the second scheduler 38 of the network processor 10 of FIG. 1. As illustrated in FIG. 4, the inventive scheduling queue 50 includes a plurality of subqueues having different respective ranges and resolutions. In the particular example illustrated, the scheduling queue 50 includes a higher resolution subqueue 52 (also indicated as subqueue 0) and a lower resolution subqueue 54 (also indicated as subqueue 1). Because both subqueues 52 and 54 have, in the examples shown, the same number of slots (e.g., 256 slots) the lower resolution subqueue 54 has a larger range than the higher resolution subqueue 52. In the particular example of FIG. 4, the lower resolution subqueue 54 has sixteen times the range and one-sixteenth of the resolution of the higher resolution subqueue 52. For example, each slot in the higher resolution subqueue 52 may correspond to one distance unit for enqueuing and dequeuing purposes, whereas each slot in the lower resolution subqueue 54 may correspond to sixteen distance units for enqueuing and dequeuing purposes. Consequently, in the examples shown, the higher resolution subqueue 52 has a range of 256 and the lower resolution subqueue 54 has a range of 4096.

Figure 3:
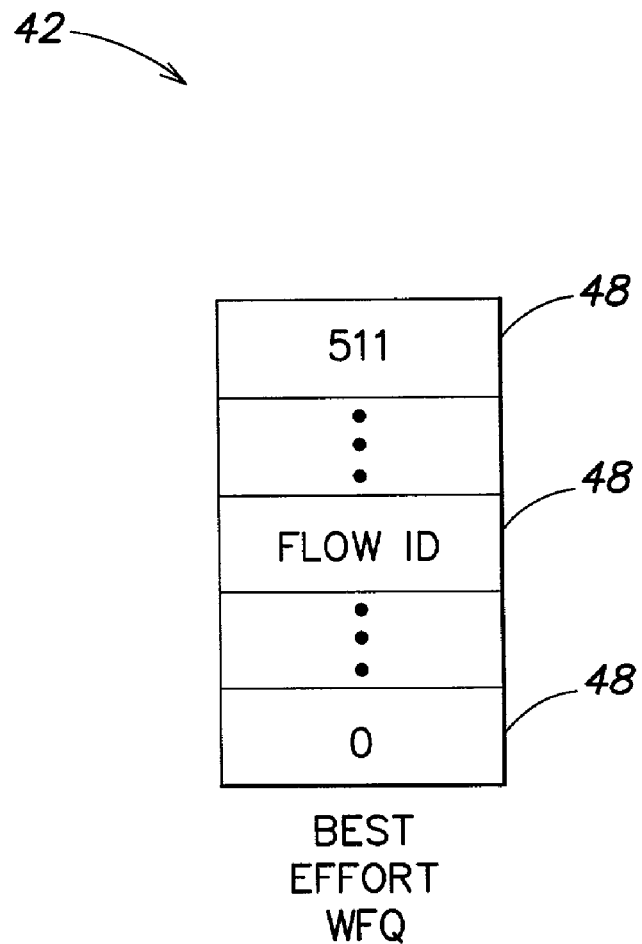
FIG. 3 is a pictorial representation of a weighted fair queuing scheduling queue provided in accordance with conventional practices.

It will be noted that the total number of slots of the two subqueues 52 and 54 is 512, which is the same as the number of slots of the prior art scheduling queue 42 shown in FIG. 3. Consequently, the inventive scheduling queue 50 of FIG. 4 may be implemented using substantially the same resources in terms of chip area, manufacturing cost and power consumption as the prior art scheduling queue 42 of FIG. 3. Nevertheless, the inventive scheduling queue 50, as will be seen, provides a greatly increased effective range allowing for accurate enqueuing of low-priority flows, while also providing most of the benefits of the high resolution of prior art scheduling queue 42 of FIG. 3 in regard to accurate enqueuing of high-priority flows. Other numbers of slots also may be employed.

Although the scheduling queue 50 is shown to have only two subqueues in the example of FIG. 4, it is contemplated to include three, four or more subqueues in the inventive scheduling queue, with each subqueue having a different range and resolution from the others. For example, a third subqueue could be added having a range 256 times the range of the highest resolution subqueue. In addition, a fourth subqueue could be added having a range that is 4096 times the range of the highest resolution subqueue.

The present invention also contemplates that a single pointer may be shared by two or more subqueues to indicate the current positions in the subqueues. In the example illustrated in FIG. 4, with two subqueues of 256 slots apiece, and the lower resolution subqueue 54 having sixteen times the range of the higher resolution subqueue 52, a 12 bit pointer may be shared. Since 8 bits are required to define the 256 slot positions in each subqueue, the 8 least significant bits may be applied to the higher resolution subqueue 52 (subqueue 0), and the 8 most significant bits may be applied to the lower resolution subqueue 54 (subqueue 1). Thus the middle four bits are shared, as illustrated by the exemplary current pointer bits in FIG. 5.

Figure 6:
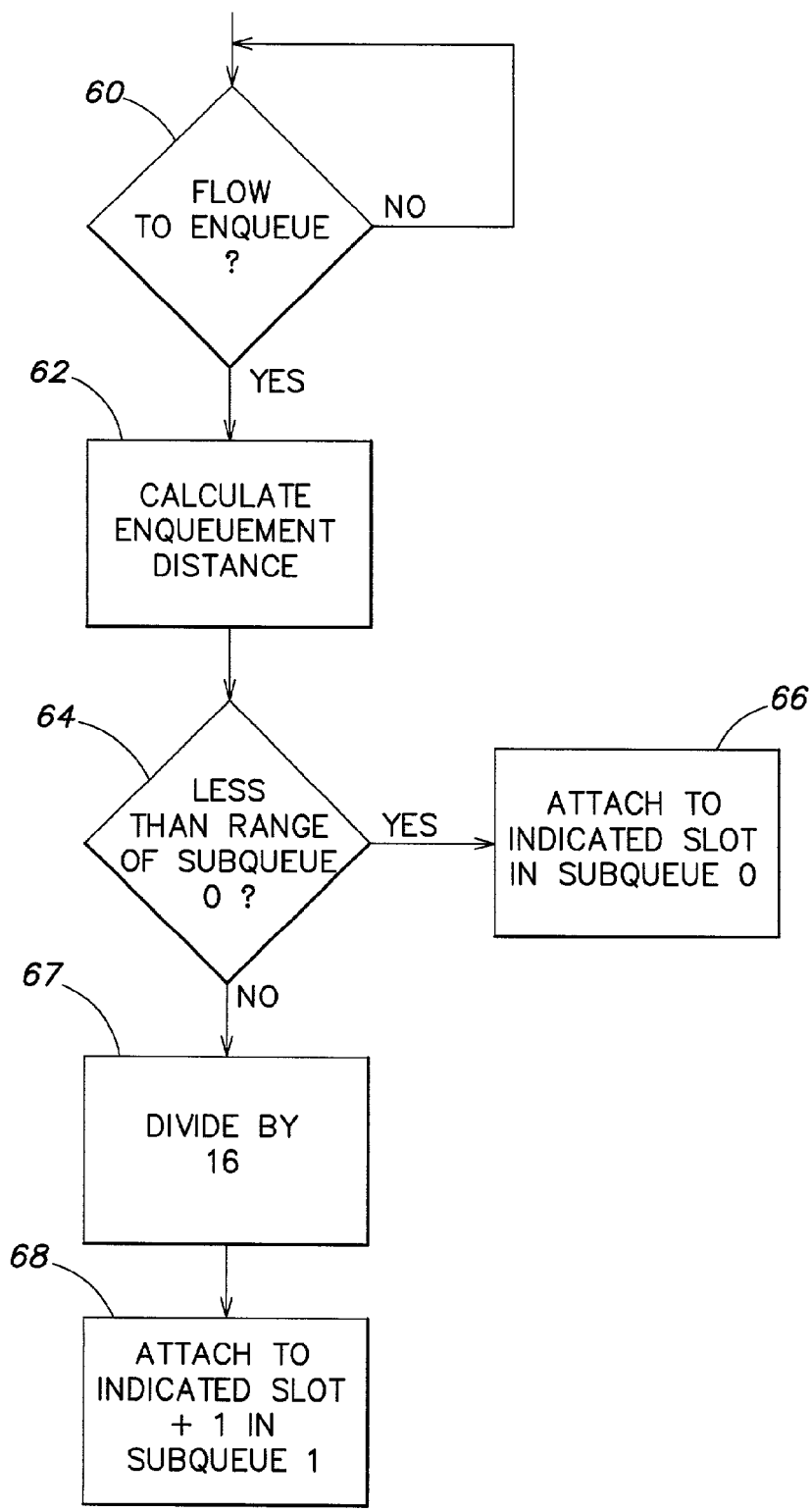
FIG. 6 is a flow chart that illustrates a process for attaching a flow to the inventive scheduling queue of FIG. 4.

FIG. 6 is a flow chart that illustrates a process by which flows are attached to the inventive scheduling queue 50. As indicated at block 60 in FIG. 6, the process of FIG. 6 idles until it is time to attach (enqueue) a flow to the scheduling queue 50. Then, at step 62, a calculation is performed to determine the distance from the current pointer at which the flow is to be attached. The formula employed to calculate this distance is the previously-mentioned formula ((WF× FS)/SF). That is, as noted above, the enqueuement distance is a product of a weighting factor WF applied to the flow based on its QoS and the size of the current frame FS, divided by a scaling factor SF.

It is then determined, at block 64, whether the resulting value is less than the range of the higher resolution subqueue 52. If that is the case, then, as indicated by block 66, the flow is attached to the higher resolution subqueue 52 at the indicated slot (i.e., at the indicated distance from the slot number indicated by the 8 least significant bits of the 12-bit current pointer).

However, if at block 64 it is found that the enqueuement distance is greater than or equal to the range of the higher resolution subqueue 52, then block 67 follows block 64. At block 67 the enqueuement distance is divided by 16 (e.g., the enqueuement distance is "scaled") to reflect the decreased resolution of the lower resolution subqueue 54. Next, at block 68, the flow is attached to the lower resolution subqueue 54 at a slot represented by the sum (e.g., using modulo 256 in an embodiment in which the lower resolution subqueue 54 employs 256 slots) of the scaled enqueuement distance plus the value indicated by the 8 most significant bits of the 12-bit current pointer, plus 1. The addition of 1 to the sum of the scaled enqueuement distance and the current pointer value is performed to take into account a preference that, as will be seen, is accorded to the lower resolution subqueue 54 during dequeuement in case of a tie with the higher resolution subqueue 52.

Figure 5:
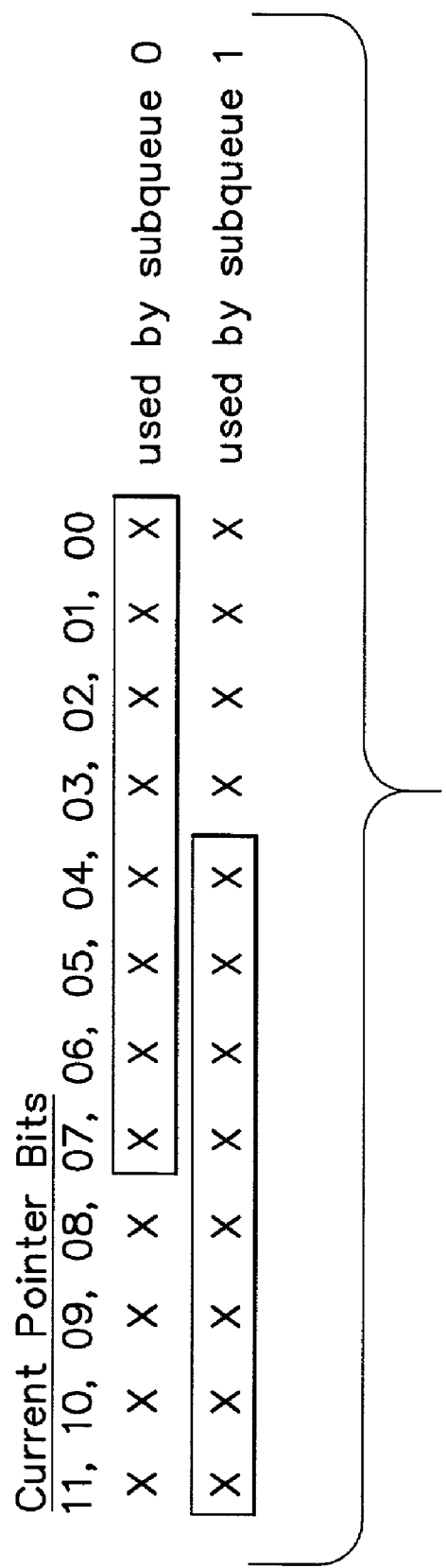
FIG. 5 is a diagram that illustrates sharing of a current pointer by the subqueues of the present invention.
Figure 7:
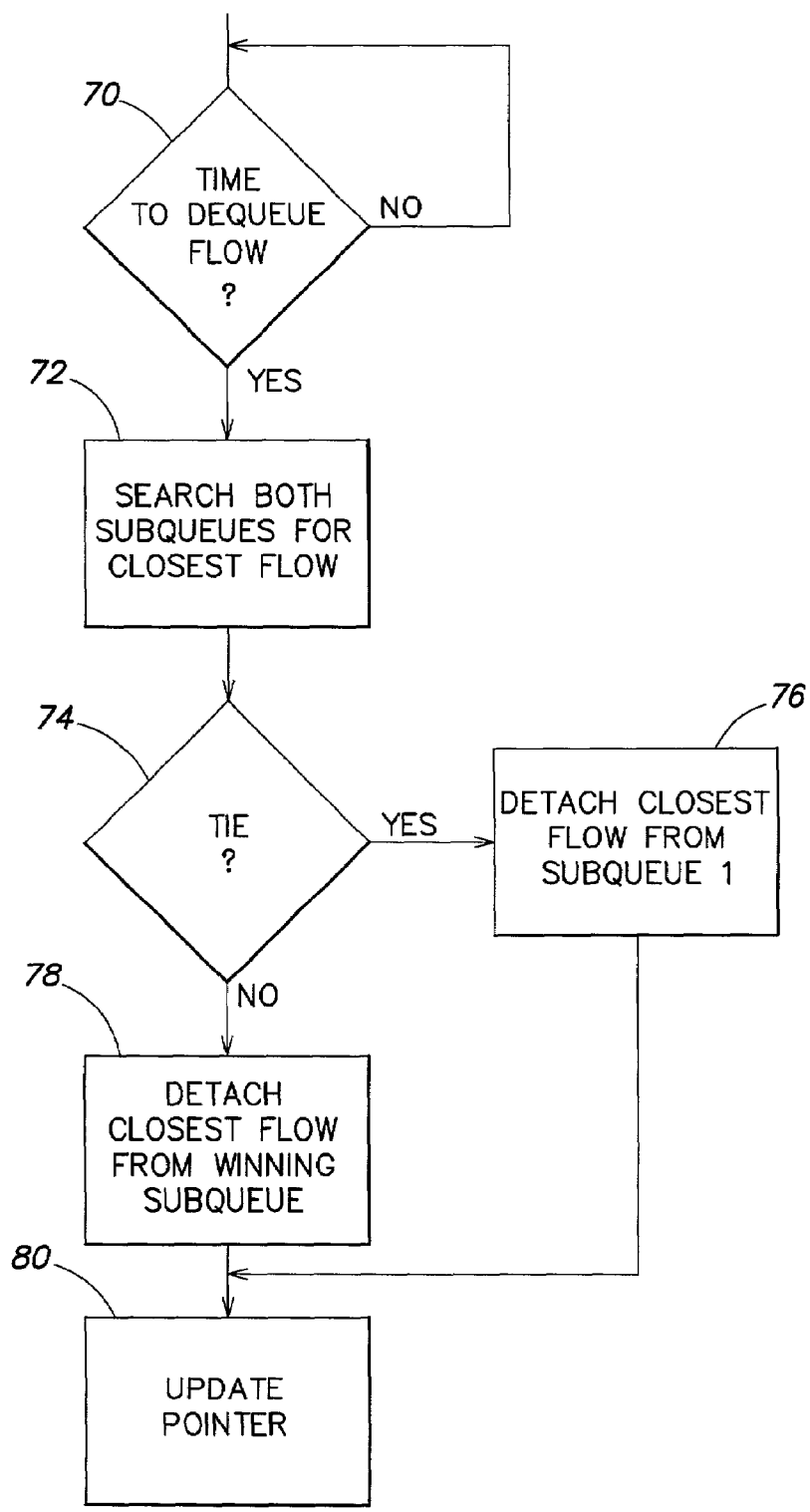
FIG. 7 is a flow chart that illustrates a process for detaching a flow from the inventive scheduling queue of FIG. 4.

FIG. 7 is a flow chart that represents a process for dequeuing (detaching or servicing) flows from the inventive scheduling queue 50. As indicated by block 70 in FIG. 7, the process of FIG. 7 idles until it is time to detach from the queue the flow which is closest to the current pointer (head) of the queue. When it is time to find and service the winning flow, block 72 follows. At block 72, both the higher resolution subqueue 52 and the lower resolution subqueue 54 are simultaneously searched for the closest flow to the current pointer of the queue. In one embodiment, the head of the queue for the higher resolution subqueue 52 is defined by the eight least significant bits of the current pointer (FIG. 5), and the head of the queue for the lower resolution subqueue 54 is defined by the eight most significant bits of the current pointer (FIG. 5). The distance from the head of the queue to each subqueue's winning flow is determined in parallel. The two distances are normalized (that is, for the lower resolution subqueue 54 a hardwired left shift of 4 bits is applied, which is equivalent to multiplying the distance by 16). It is then determined whether the two distances result in a tie (block 74). If there is a tie between the two subqueues, then the closest flow from the lower resolution subqueue 54 is selected for detachment (block 76). The lower resolution subqueue 54 is allowed to win in case of a tie to prevent it from being "starved" by the higher resolution subqueue 52. That is, the lower resolution subqueue 54 could be preempted indefinitely by the higher resolution subqueue 52.

If there is no tie, then block 78 follows block 74. At block 78 the winning flow is detached and serviced. (It will be understood that the "winning flow" is the flow that is closest to the head of the queue.)

Following block 76 or 78, as the case may be, is block 80, at which the position of the current pointer is updated to the position of the slot from which the winning flow was detached. (It should be noted that the process described in connection with FIG. 7 assumes that the scheduling queue in question is not empty. The process further assumes that bandwidth is available, i.e., that there is no higher priority or scheduled service that preempts servicing of a winning flow from the scheduling queue.)

Figure 2:
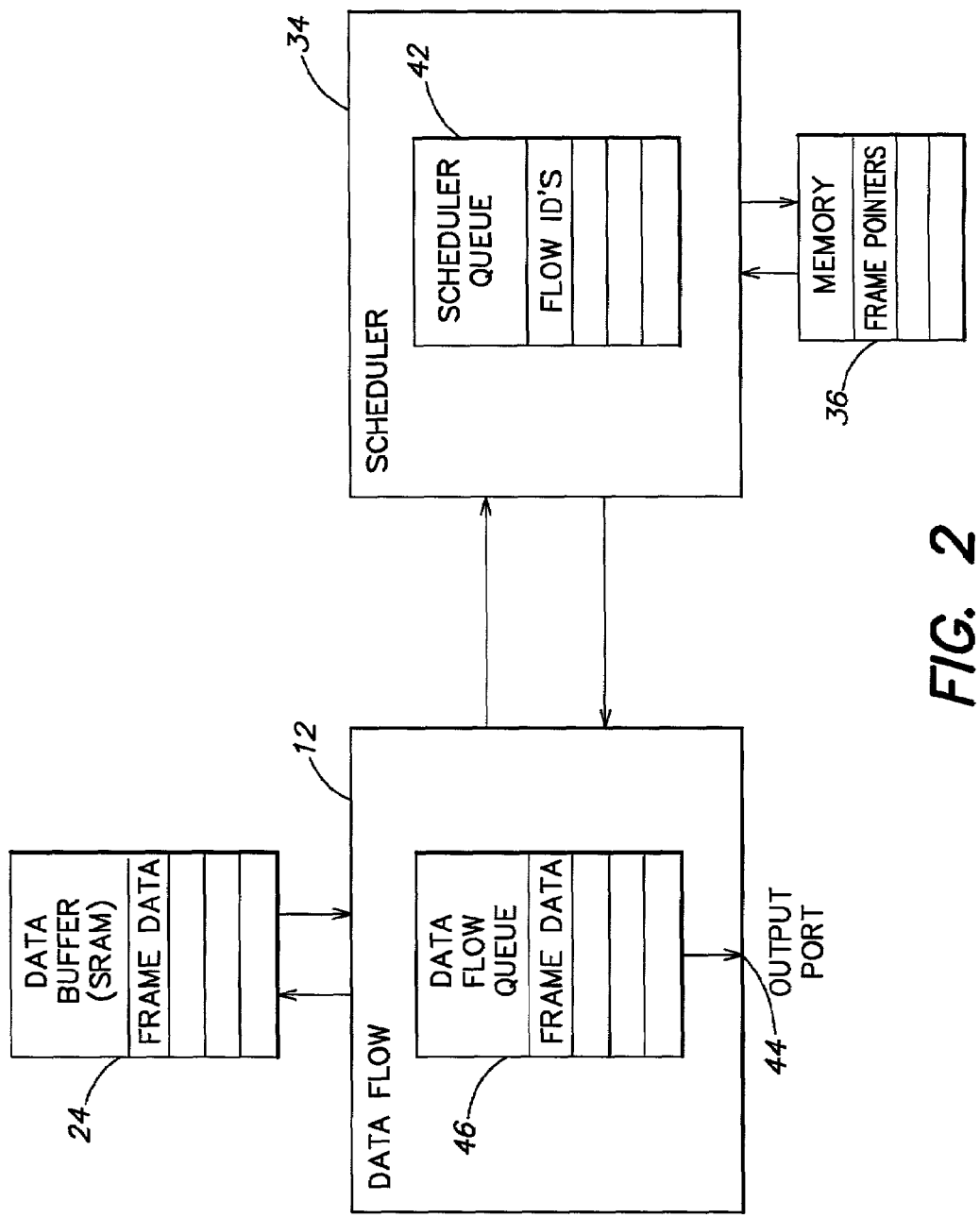
FIG. 2 is a block diagram representation of conventional queuing arrangements provided in a data flow chip/scheduler pair included in the network processor of FIG. 1.

The processes of FIGS. 6 and 7 are suitable for use where a scheduling queue consists of two subqueues. However, those of ordinary skill in the art will readily recognize how the processes of FIGS. 6 and 7 can be extended to management of a scheduling queue having more than two subqueues. The processes of FIGS. 6 and 7 may be implemented in hardware, software or a combination thereof. In at least one embodiment of the invention, the processes of FIGS. 6 and 7 are implemented in hardware employing a suitable combination of conventional logic circuitry such as adders, comparators, selectors, etc. Such hardware, for example, may be located within the scheduler 34 and/or the scheduler 38 (FIG. 2). A person of ordinary skill in the art may develop logic circuitry capable of performing the inventive processes described with reference to FIGS. 6 and 7. In a software embodiment of the invention, the processes of FIGS. 6 and 7 may comprise one or more computer program products. Each inventive computer program product may be carried by a medium readable by a computer (e.g., a carrier wave signal, a floppy disk, a hard drive, a random access memory, etc.)

Figures 8A, 8B, 8C:
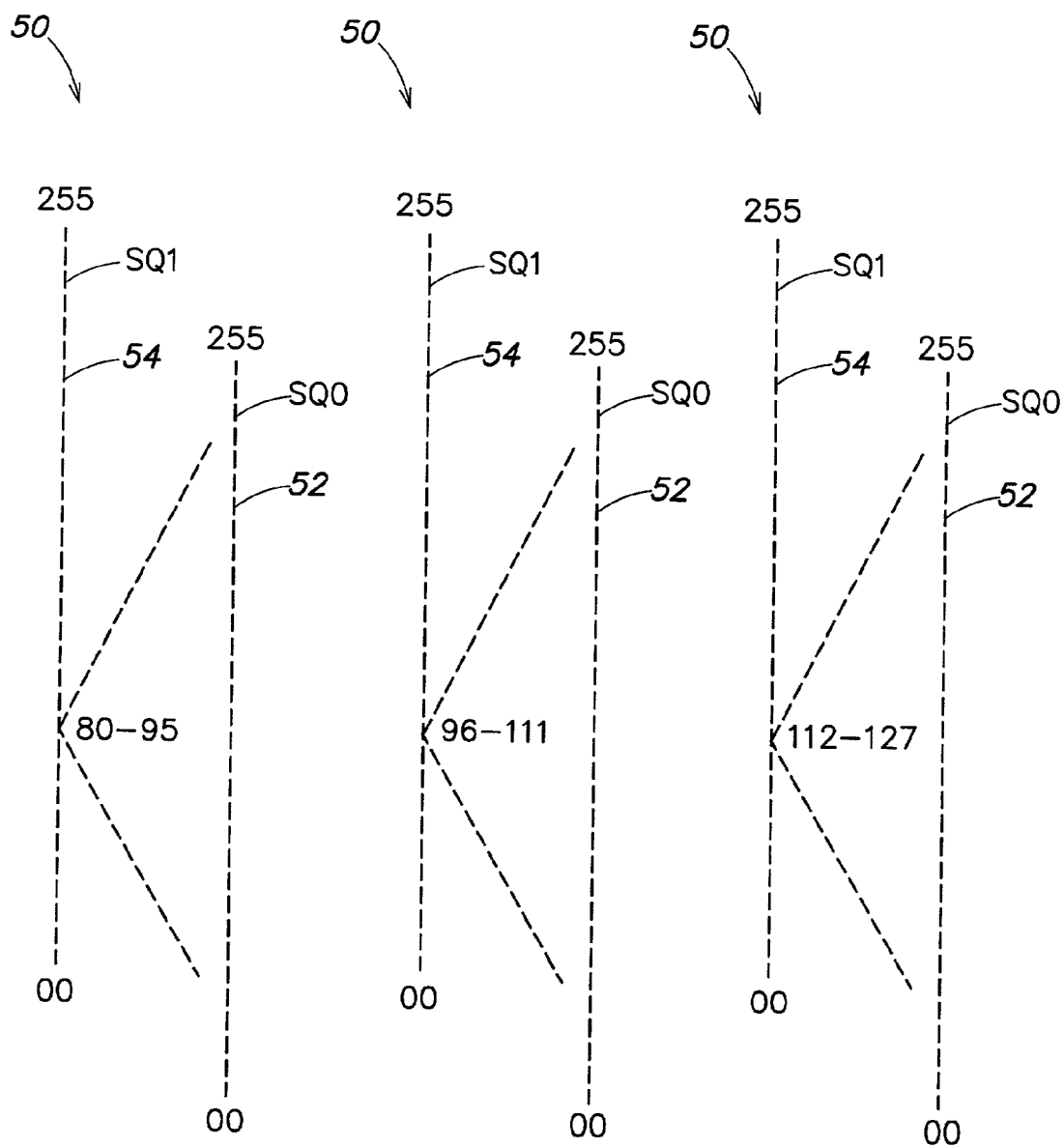
FIGS. 8A–8C pictorially represent a higher resolution subqueue "sliding" along a lower resolution subqueue as a current pointer advances.

FIGS. 8A–8C together schematically illustrate how the inventive scheduling queue 50 combines advantages of wide range with, in effect, high resolution. Lower resolution subqueue 54, with each of its 256 slots corresponding to sixteen distance units, has a total range of 4096. As the current pointer advances, the higher resolution subqueue 52 in effect "slides" along the lower resolution subqueue 54, providing a high resolution of one distance unit per slot over a subrange of 256 distance units. That is, in FIG. 8A, higher resolution subqueue 52 overlaps with slots 80–95 of lower resolution subqueue 54; in FIG. 8B, higher resolution subqueue 52 overlaps with slots 96–111 of lower resolution subqueue 54; and in FIG. 8C, higher resolution subqueue 52 overlaps with slots 112–127 of lower resolution subqueue 54. Thus for flows to be enqueued relatively close to the current pointer, high resolution is provided by the higher resolution subqueue 52. At the same time, the wide possible range of frame sizes and weighting factors are accommodated by the extended range of the lower resolution subqueue 54. It will be noted that the inventive scheduling queue 50 has the same number of physical slots, namely 512, as the prior art scheduling queue 42 of FIG. 3, yet a much larger range is provided in the inventive scheduling queue 50, while preserving much of the benefit of high resolution via the higher resolution subqueue 52. Other numbers of slots may be employed.

The invention also reduces the search time required to examine the scheduling queue for entries, and is scalable to larger designs. Both subqueues can be searched at the same time since they are physically separate and are controlled through the same current pointer. Accordingly, adding more subqueues will lead to better performance when searching for entries in the scheduling queue because there is more searching in parallel.

The foregoing description discloses only exemplary embodiments of the invention; modifications of the above disclosed apparatus and methods which fall within the scope of the invention will be readily apparent to those of ordinary skill in the art. For example, although in the above description the ratio of the respective ranges and resolutions of the subqueues was selected to be 16, other ratios may be selected, including 2, 4, 8, 32 or 64. It also is not necessary that the ratio be a power of 2. That is, no specific relationship between subqueue resolution and range is required, and a resolution of a subqueue may be decreased independently of an amount by which a range of the subqueue is increased. As noted before, more than two subqueues having different ranges and resolutions may be included in the inventive scheduling queue.

Moreover, in the above description, the inventive scheduling queue has been implemented in a separate scheduler chip associated with a network processor. However, it is also contemplated to implement the inventive scheduling queue in a scheduler circuit that is implemented as part of a data flow chip or as part of a processor chip in a network processor.

Accordingly, while the present invention has been disclosed in connection with exemplary embodiments thereof, it should be understood that other embodiments may fall within the spirit and scope of the invention as defined by the following claims.

The invention claimed is:

1. A method of dequeuing a flow from a scheduling queue in a scheduler for a network processor, comprising:
    searching a first subqueue of the scheduling queue to find a first winning flow in the first subqueue;
    determining a first queue distance corresponding to a distance between a current pointer and a slot in which the first winning flow is enqueued;
    searching a second subqueue of the scheduling queue to find a second winning flow in the second subqueue;
    determining a second queue distance corresponding to a distance between the current pointer and a slot in which the second winning flow is enqueued;
    comparing the first and second queue distances; and
    selecting for dequeuing one of the first and second winning flows based on a result of the comparing step.

2. The method of claim 1, further comprising normalizing the first and second queue distances before the comparing step.

3. The method of claim 2, wherein the normalizing includes multiplying the second queue distance by a factor.

4. The method of claim 3, wherein the factor is 16.

5. The method of claim 1, further comprising updating the current pointer.

6. The method of claim 1, wherein the first queue distance is determined with reference to least significant bits of the current pointer, and the second queue distance is determined with reference to most significant bits of the current pointer.

7. A computer program product for dequeuing a flow from a scheduling queue in a scheduler for a network processor, the computer program product comprising:
    a medium readable by a computer, the computer readable medium having computer program code to:
        search a first subqueue of the scheduling queue to find a first winning flow in the first subqueue;
        determine a first queue distance corresponding to a distance between a current pointer and a slot in which the first winning flow is enqueued;
        search a second subqueue of the scheduling queue to find a second winning flow in the second subqueue;
        determine a second queue distance corresponding to a distance between the current pointer and a slot in which the second winning flow is enqueued;
        compare the first and second queue distances; and
        select for dequeuing one of the first and second winning flows based on a result of the comparison of the first and second queue distances.

8. A scheduler for a network processor, the scheduler comprising a scheduling queue in which flows are enqueued according to the formula CP+((WF×FS)/SF) wherein:
    CP is a pointer for indicating a current position in the scheduling queue;
    WF is a weighting factor associated with a flow appointed for enqueuing;
    FS is a frame size associated with the flow appointed for enqueuing; and
    SF is a scaling factor; including the scheduling queue includes at least a first subqueue and a second subqueue, and the flow appointed for enqueuing is enqueued to the first subqueue if the value of the expression ((WF×FS)/SF) is less than a range of the first subqueue and the flow appointed for enqueuing is enqueued to the second subqueue if the value of the expression ((WF×FS)/SF) is greater than a range of the first subqueue and wherein the pointer CP is shared by the first and second subqueues, and least significant digits of the pointer are applied to the first subqueue and most significant digits of the pointer are applied to the second subqueue.

9. The scheduler of claim 8, wherein the first subqueue has a number of slots that is equal to a number of slots of the second subqueue.

10. The scheduler of claim 8, wherein the first subqueue has a number of slots that as different than a number of slots of the second subqueue.

11. The scheduler of claim 8, wherein the second subqueue has a range that is larger than the range of the first subqueue and the second subqueue has a resolution that is less than a resolution of the first subqueue.

12. A method of managing a scheduler having a scheduling queue defining a sequence in which flows are to be serviced, the scheduling queue having at least a first subqueue and a second subqueue, the first subqueue having a first range and a first resolution and the second subqueue having a second range that is greater than the first range and a second resolution that is less than the first resolution, the method comprising:
    determining a distance from a current pointer at which a flow is to be attached;
    determining if the distance is less than the first range of the first subqueue, and if so, attaching the flow to the first subqueue;
    determining if the distance as greater than the first range of the first subqueue, and if so, attaching the flow to the second subqueue; and
    scaling the distance prior to attaching the flow to the second subqueue.

* * * * *